Dec. 3, 1946.  R. E. HOGAN  2,411,966
ELEVATING PLATFORM APPARATUS
Original Filed May 1, 1944  2 Sheets-Sheet 2

Inventor
Ray E. Hogan.

By Clarence A. O'Brien
and Harvey B. Jackson
Attorneys

Patented Dec. 3, 1946

2,411,966

UNITED STATES PATENT OFFICE 2,411,966

ELEVATING PLATFORM APPARATUS

Ray E. Hogan, Ardmore, Okla.

Substituted for application Serial No. 533,624, May 1, 1944. This application June 12, 1945, Serial No. 598,944

4 Claims. (Cl. 304—9)

1

This invention relates to an elevating platform apparatus primarily designed for use by a workman, and embodying a vertically movable platform on which the workman may stand, and hoisting means for vertically adjusting the platform and thereby supporting the workman at the various elevations at which work is to be performed.

The primary object of the present invention is to provide an apparatus of the above kind which is constructed so that the operating means for the hoist is always within convenient reach of the workman standing on the platform, and so that the workman may effect vertical adjustment of the platform without dismounting therefrom.

A further object of the invention is to provide an apparatus of the above kind which is simple and durable in construction, efficient, and easy to use.

Another object is to provide an improved apparatus of the above kind wherein the platform is carried by parallel arms pivoted to the platform and a supporting frame in such a way as to maintain the platform in a horizontal position in all vertically adjusted positions thereof.

The present application is a substitute for my application upon Elevating platform for workmen, Serial #533,624, filed May 1, 1944, and allowed December 13, 1944.

A preferred embodiment of the invention is shown in the accompanying drawings, in which.

Figure 1:
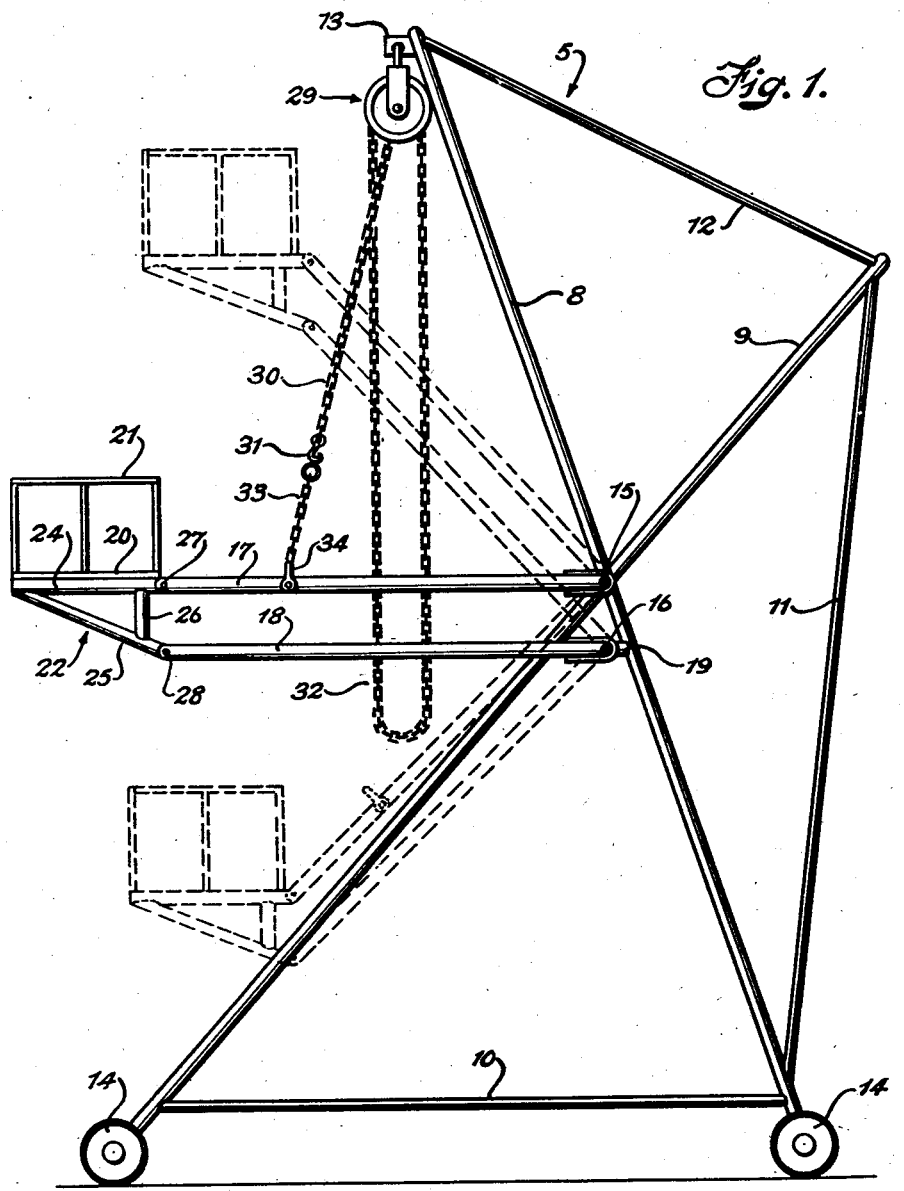
Figure 1 is a side elevational view of the apparatus.
Figure 2:
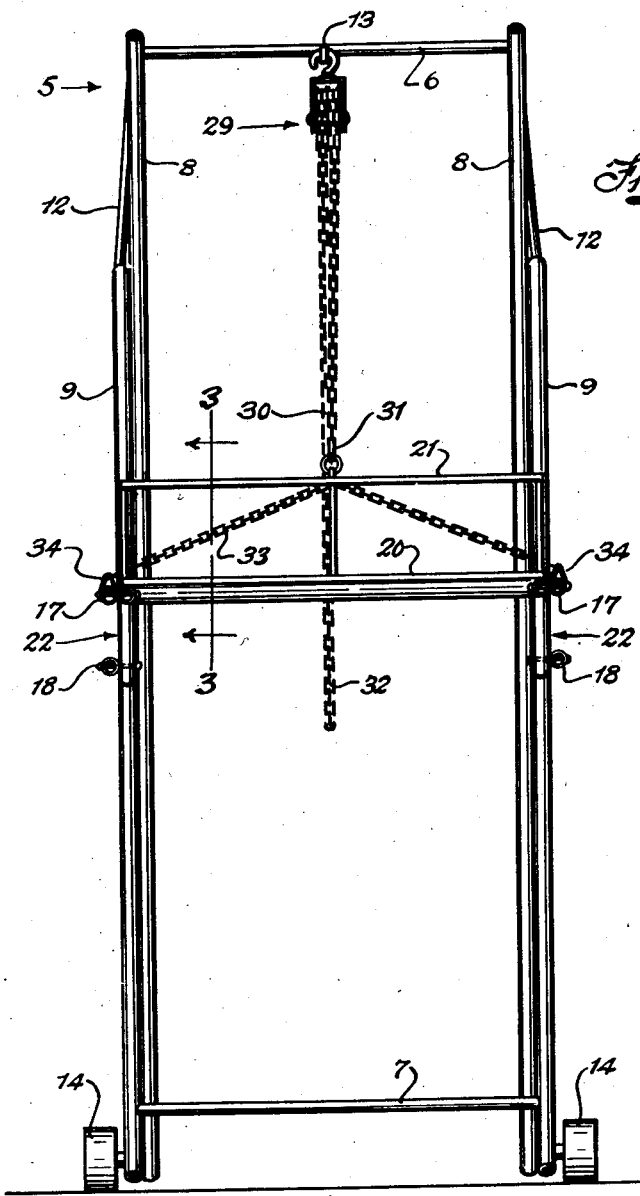
Figure 2 is a front elevation thereof.
Figure 3:
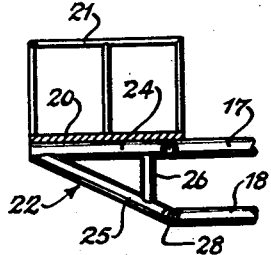
Figure 3 is a fragmentary vertical section taken on line 3—3 of Figure 2.

Referring in detail to the drawings, the illustrated embodiment includes a supporting frame 5 composed of spaced vertical side members rigidly connected by cross members 6 and 7. Each side member consists of two crossed oppositely inclined bars 8 and 9 secured together at their crossing point, the rearwardly inclined bar 8 being longer and extending higher than the bar 9. A horizontal brace member 10 connects the bars 8 and 9 near their lower ends, another brace member 11 connects the upper end of bar 9 with the lower end of bar 8, and still another brace member 12 connects the upper ends of bars 8 and 9. The cross member 6 connects the upper ends of the bars 8 of the side members and has a central forwardly projecting ear 13 whose purpose will be presently described. The frame 5 is preferably readily portable, and for this purpose, the lower

2 ends of the bars 8 and 9 may be equipped with small supporting wheels 14.

Pivoted in the same vertical plane and at corresponding ends, as at 15 and 16, to each side member of the frame 5 and for vertical swinging movement, are vertically spaced parallel arms 17 and 18 which are of equal length and extend forwardly from the frame 5. The pivots 15 and 16 are located substantially midway between the top and bottom of the frame, respectively at the crossing points of the bars 8 and 9 and to a bar 19 connecting the bars 8 and 9 below the crossing points thereof. Carried by the forward ends of arms 17 and 18 is a platform consisting of a frame having a floor plate 20 secured thereon, a railing or fence 21 being provided around the edge of the platform. The platform frame consists of spaced triangular side brackets 22 rigidly connected by a cross member 23, and each embodying a horizontal upper member 24, a rearwardly inclined lower member 25 rigidly connected at its forward end to the forward end of member 24, and a vertical member 26 rigidly connecting the members 24 and 25 near their rear ends. The forwad ends of arms 17 and 18 are respectively pivoted at 27 and 28 to the rear ends of members 24 and 25. Suspended from the ear 13 is a hoisting tackle 29 of a well known self-locking type including a hoisting chain 30 having a hook on the free end thereof, and a depending endless operating chain 32 for the hoisting tackle.

It will be seen that the upper forward portion of frame 5 from which the hoisting tackle is suspended, overhangs the rear portions of arms 17 and 18, and said arms are of such length that the operating chain 32 is at all times within reach of the workman standing on the platform. Thus, the workman may operate the hoisting tackle at all times to adjust the platform to the desired height or elevation. The effect of the arms 17 and 18 is to maintain the platform in a horizontal position in all vertically adjusted positions thereof, as indicated by the dotted line positions of the arms and platform in Figure 1. The hook 31 is engaged with a stradle chain 33 intermediate the ends of the latter, said stradle chain having its ends connected to the respective upper arms 17 rearwardly of and adjacent the platform, by clevises 34.

In operation, the operator simply stands upon the platform and operates the chain 32 so that the hoisting chain 30 causes upward swinging movement of arms 17 and 18 and corresponding elevation of the platform. As soon as the workman reaches the height necessary to perform the desired work, he discontinues operation of the chain 32, and the hoisting tackle automatically retains the platform in the desired vertically adjusted position. By operating the chain 32 in the opposite direction, the platform may be lowered as desired when work is to be performed at a lower level or elevation.

From the foregoing description, it is believed that the construction, operation and advantages of the present invention will be readily understood and appreciated by those skilled in the art. It will be seen that I have provided an apparatus of practical construction well adapted for carrying out the stated objects of the invention and to meet with the requirements for a successful commercial use. Obviously, the invention is capable of modification and changes in details of construction illustrated and described, such as fall within the spirit of the invention as claimed.

What I claim is:

1. The combination of a portable hoist having a wheeled base, a standard fixedly mounted on said base, and a hoisting tackle freely suspended from the standard, with spaced brackets, an elevating platform secured on said brackets, means for positioning and maintaining the platform at a plurality of selected horizontal positions above the ground, said means consisting of a set of upper and lower arms having hinged connections at corresponding ends with said brackets, other hinge connections between the other ends of the arms and said standard, and a straddle chain having its ends secured to said upper arms, said hoisting tackle including a depending operating element always within reach of and operable by a workman standing on said platform.

2. The combination of a portable hoist having a wheeled base, a standard fixedly mounted on said base, and a hoisting tackle freely suspended from the standard, with an elevating platform including triangular brackets, means for positioning and maintaining the platform at a plurality of selected horizontal positions above the ground, said means consisting of a set of upper and lower arms having hinge connections at corresponding ends with said brackets, other hinge connections between the other ends of the arms and said standard, and a straddle chain having clevises at its ends secured to said upper arms and connected to said hoisting tackle, said platform being fenced in.

3. An elevating platform apparatus comprising a supporting frame, upper and lower arms pivoted at their rear ends to the frame between the top and bottom of the latter for vertical swinging movement, a platform, the forward ends of said arms being pivoted to the platform for maintaining the latter in a horizontal position in all vertically adjusted poistions thereof, said frame having an upper portion overhanging the arms, and a hoisting tackle suspended from the upper portion of the frame and including a hoisting element connected to the upper arms and a depending operating element always within reach of and operable by a workman standing on the platform.

4. The construction defined in claim 3, wherein the supporting frame includes an upper front portion overhanging the arms and embodying a cross member, said hoisting tackle being suspended from said cross member intermediate the ends of the latter.

RAY E. HOGAN.